US008516207B2

(12) United States Patent
Li et al.

(10) Patent No.: US 8,516,207 B2
(45) Date of Patent: Aug. 20, 2013

(54) REMOTE ONLINE BACKUP SYSTEM AND METHOD BASED ON STAGER FRAGMENTED TRANSMISSION

(75) Inventors: Tak Ho Alex Li, Kowloon (HK); Ping Shum, Kowloon (HK)

(73) Assignee: BizCONLINE Limited, Kowloon (HK)

( * ) Notice: Subject to any disclaimer, the term of this patent is extended or adjusted under 35 U.S.C. 154(b) by 271 days.

(21) Appl. No.: 12/683,855

(22) Filed: Jan. 7, 2010

(65) Prior Publication Data

US 2011/0055503 A1 Mar. 3, 2011

(30) Foreign Application Priority Data

Aug. 28, 2009 (CN) .......................... 2009 1 0169659

(51) Int. Cl.
*G06F 12/16* (2006.01)

(52) U.S. Cl.
USPC .......................................... 711/162; 707/612

(58) Field of Classification Search
USPC ....................................................... 711/162
See application file for complete search history.

(56) References Cited

U.S. PATENT DOCUMENTS

| 6,085,298 | A * | 7/2000 | Ohran ........................... 711/162 |
| 6,324,654 | B1 * | 11/2001 | Wahl et al. .................... 714/6.12 |
| 6,718,361 | B1 * | 4/2004 | Basani et al. ................. 709/201 |
| 7,882,286 | B1 * | 2/2011 | Natanzon et al. .............. 710/74 |
| 8,195,770 | B1 * | 6/2012 | Aral et al. ..................... 709/219 |
| 2005/0246575 | A1 * | 11/2005 | Chen et al. ........................ 714/6 |
| 2005/0262321 | A1 * | 11/2005 | Iino ............................... 711/164 |
| 2006/0085610 | A1 * | 4/2006 | Iwamura et al. .............. 711/162 |
| 2006/0123212 | A1 * | 6/2006 | Yagawa ......................... 711/162 |
| 2007/0106855 | A1 * | 5/2007 | Hosouchi et al. ............. 711/162 |
| 2010/0049798 | A1 * | 2/2010 | McCabe et al. ............... 709/203 |
| 2010/0122053 | A1 * | 5/2010 | Prahlad et al. ................ 711/162 |

* cited by examiner

*Primary Examiner* — Kaushikkumar Patel
(74) *Attorney, Agent, or Firm* — Sughrue Mion, PLLC (57) ABSTRACT

The present invention provides a remote online backup method based on stager fragmented transmission, comprising: defining a journal storage system as a journal relay system, i.e., a Journal Stager; dividing the Journal Stager into a Local Journal Stager and a Remote Journal Stager to optimize backup transmission performance of the whole online backup system; setting between the Local Journal Stager and the Remote Journal Stager a transmitter, by which a journal is transmitted from one stager to another stager; applying the journal to a backup storage device through a Journal Replayer at a backup destination site.

18 Claims, 8 Drawing Sheets

REMOTE ONLINE BACKUP SYSTEM AND METHOD BASED ON STAGER FRAGMENTED TRANSMISSION

TECHNICAL FIELD

The present invention relates to a remote online backup, and in particular relates to a remote online backup based on stager fragmented transmission, which can improve performance and functions of online backup.

BACKGROUND

When many information system managers consider whole backup disaster recovery architecture of the information system, in order to sufficiently deal with various disaster situations, a remote Disaster Recovery Site is considered to be established to remotely backup data as one more copy besides local site backup.

However, because of facing explosive increase of data, it is difficult for more and more enterprises to deal with backup of huge data. Therefore, developing online backup services is a general trend. Nevertheless, being affected by complicated network environments such as cross-border, cross-country, etc., and limited network bandwidth, efficiency of remote online backup based on direct control by client servers is low, and system and network overhead of the client servers is increased.

Figure 1:
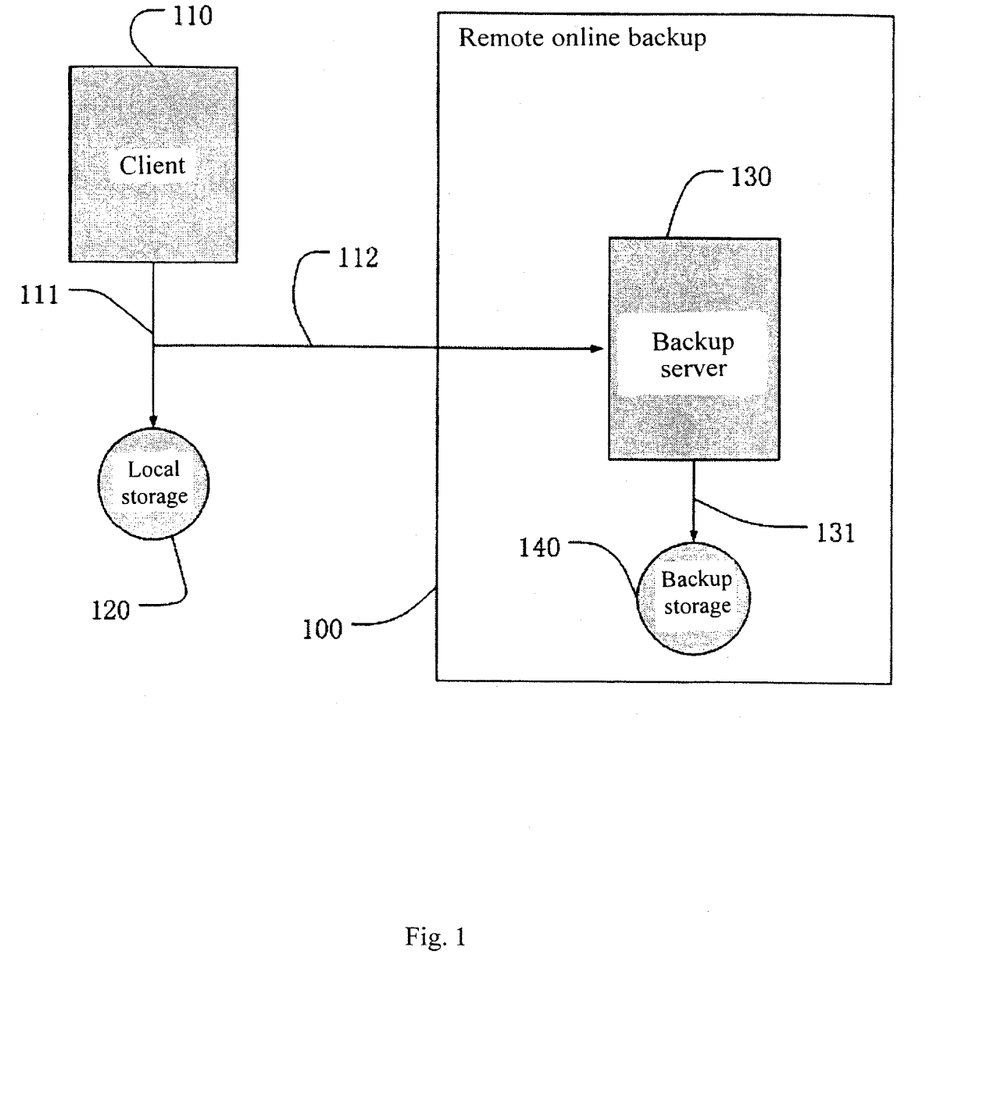
FIG. 1 illustrates components and operations of a prior art backup system.

FIG. 1 illustrates components and operations of a prior art backup system. In present applications, when a client 110 writes data into local storage 120 (arrow 111), the data will be captured and transmitted to a backup server 130 through network (arrow 112), and the backup server 130 will apply journals to corresponding data in backup storage 140 (arrow 131). This is a traditional backup system 100, and implementation method thereof can effectively reduce data transmission volume since only journal data will be transmitted over the network. However, if the system is applied to a complicated remote network system, many cases such as network jam will still be encountered, which will affect overhead for system resources of the client 110.

In this context, in order to solve this problem, the present invention proposes a remote online backup system based on journal stager fragmented transmission, which can improve efficiency of the remote online backup and alleviate burdens of the client server.

Prior art remote online backup is to directly transmit data to remote backup sites, and this backup manner will results in huge system and network resources to be consumed in the case of complicated and slow network environment. Whereas the present invention uses a manner of local-remote Journal Stager, in which backup data is firstly buffered in manner of journal at a local place which has relatively fast speed, and then, is transmitted to a remote place. Therefore, system overhead can be greatly saved.

Further more, expansibility of the prior arts is relatively poor, in which same data need to be sent to multiple points respectively when multiple points remote backup is to be implemented; not only operations are trivial but also resources are wasted. Whereas adopting the manner of the present invention, only a flag SID of one remote site needs to be added into the backup data, and the job for sending data to new added sites operation will be implemented by a Journal Stager and a transmitter, which greatly simplifies management and network resources will be more efficiently utilized.

SUMMARY

Other aspects and advantages of the present invention are partly illustrated in following description and are partly obvious from the description, or can be obtained in practices of the present invention.

The present invention is directed to provide an improved remote online backup system, which can be utilized for network based high performance-to-price ratio data protection.

The present entity is achieved by a stager fragmented transmission method, which comprises following techniques:

defining a journal record;
activating the journal record;
performing initialization copy of protected data;
replaying all journals of a first record to ensure consistency of data after the initialization copy is completed;
performing journal transmission during a preset time interval;
fragmented transmitting a journal at a Journal Stager;
replaying the journal in a Journal Replay device (referred as Journal Replayer herein) at a destination site.

The present invention provides a remote online backup method based on stager fragmented transmission, comprising: defining a journal storage system as a journal relay system, i.e., a Journal Stager; dividing the Journal Stager into a Local Journal Stager and a Remote Journal Stager to optimize backup transmission performance of the whole online backup system; setting between the Local Journal Stager and the Remote Journal Stager a transmitter, by which a journal is transmitted from one stager to another stager; applying the journal to a backup storage device through a Journal Replayer at a backup destination site.

The present invention further provides a method for performing remote online backup by Disaster Recovery Sub Sites and a Disaster Recovery Main Site, comprising: a. a plurality of clients transmitting journals to respective corresponding Local Journal Stagers respectively; b. sending the journals to directly connected Remote Journal Stagers by transmitters; c. the Remote Journal Stagers determining whether the present site coincides with a flag of a destination Disaster Recovery Main Site in a received journal; d. determining whether the present site is a Disaster Recovery Sub Site if not coinciding; sending the journal to a Journal Replayer of the present Disaster Recovery Sub Site if the present site is a Disaster Recovery Sub Site and returning to step b, and directly returning to step b if the present site is not a Disaster Recovery Sub Site; e. performing processing for sending the journal to a Journal Replayer of the Disaster Recovery Main Site if coinciding.

The present invention further provides a remote online backup system based on stager fragmented transmission, comprising: one or more clients for writing data into their local storage and transmitting the data to Local Journal Stagers in manner of journal; Local Journal Stagers for reserving the journals from the clients and pushing the journals to the transmitters; the transmitters for transmitting the journals from the Local Journal Stagers to Remote Journal Stagers; the Remote Journal Stagers for receiving the journals and transmitting them to Journal Replayers or other Remote Journal Stagers; and the Journal Replayer for applying the journals to device storage devices.

The present invention further provides a system for performing remote online backup by Disaster Recovery Sub Sites and a Disaster Recovery Main Site, comprising: a plurality of clients for transmitting journals to respective corresponding Local Journal Stagers respectively; a plurality of Local Journal Stagers for sending journals to Remote Journal Stagers directly connected with Local Journal Stagers through transmitters; a plurality of transmitters for transmitting the journals from the Local Journal Stagers to the Remote Journal Stagers; a plurality of Remote Journal Stagers for receiving the journals from the transmitters and sending the journals to the Disaster Recovery Sub Sites and the Disaster Recovery Main Site connected to the plurality of Remote Journal Stagers; the plurality of Disaster Recovery Sub Sites for replaying the journals to backup storage devices and sending the journals to the Remote Journal Stagers connected to the Disaster Recovery Main Site simultaneously; and the Disaster Recovery Main Site for receiving the journals from the Remote Journal Stagers and replaying and storing the journals to a backup storage device.

At present, when facing explosive data volume and increasing speed, many enterprises select using remote online backup service manner in place of original backup manner or outsourcing backup services. The present invention can provide online backup techniques and services of higher performance and better expansibility by using journal transmission techniques and coordination between Local Journal Stagers and Remote Journal Stagers, and advantages thereof comprises:

1. Faster online backup performance: setting Journal Stagers at local places having relatively fast network speed and transmitting backup data in manner of journal, so that speed is significantly increased as compared with traditional backup manners.

2. Remote multiple sites backup manner: data can be transmitted to a plurality of remote sites using transmitters and site transit by establishing Remote Journal Stagers, without affecting local backup performance, which facilitates implementing complex backup processing of multiple points to multiple points in the case of having branch organizations and multiple branch offices.

3. Better expansibility: if more backup sites are to be added, only new Journal Stagers need to be installed simply, which simplifies difficulty for arranging the whole backup system and is easy to maintain and replace.

BRIEF DESCRIPTION OF THE DRAWINGS

The above and other objects, features, and advantages of the present invention will become clearer from the detailed description of preferred embodiments of the present invention in conjunction with the attached drawings, in which same reference numbers indicate units with same structure and in which.

DETAILED DESCRIPTION

Hereinafter, the present invention will be fully described with reference to the figures showing embodiments of the present invention. However, the present invention can be implemented in many different forms, rather than being considered as being limited to embodiments described herein. On the contrary, these embodiments are provided to make disclosure of the present invention thorough and complete and to fully express scope of the present invention to those skilled in the art. In the figures, components are amplified for clarity.

Unless otherwise defined, all terms used herein (including technical and scientific terms) have same meanings to those commonly understood by those of ordinary skills in the art that the present invention belongs to. It is also understood that terms such as those defined in general dictionaries should be construed as having meanings consistent with meanings of the terms in the context of related arts, rather than being construed with idealized or extremely formalized meanings, unless being explicitly defined herein.

A preferred implementation of the present invention is containing a backup system, which has additional structures for improving performance and reducing cost. Principles and operations of the backup storage system in the present invention will be better understood with reference to the figures and explanations thereof. Nevertheless, meanings described and defined herein of the present invention include but are not limited to cases analyzed by all following examples.

According to the method of the present invention, Journal Stagers will be divided into Local Journal Stagers (referred as LocalStager herein) and Remote Journal Stagers (referred as RemoteStager herein), online backup requirements under complicated network environments can be adapted by coordination between them, and online backup between multiple sites and multiple sites can be further achieved by working together of a plurality of Journal Stagers. By dividing into Local Journal Stagers (LocalStager) and Remote Journal Stagers (RemoteStager), various bandwidth resources can be effectively and sufficiently utilized, affections brought by network bandwidth differences of different places can be avoided to the greatest degree, remote backup across broad area ranges or even global remote backup can be indeed realized. To this end, the present invention constructs an architecture of multiple levels divided into a Disaster Recovery Main Site (referred as MainSite herein) and Disaster Recovery Sub Sites (referred as SubSite), for satisfying cross-region and multiple-site backup recovery requirements of large scale multinational corporations/organizations, etc.

As compared with remote online backup techniques of single object and point-to-point as presented in prior arts or documents, the present invention innovates extensively and intensively to propose an aggregative and cross-region remote online backup architecture, and create a brand new concept of Remote Journal Stagers (RemoteStager) aiming at the disadvantage that it is difficult to connect and it is slow to transmit between separate individual clients in different countries or different regions, so that multiple corporations or multiple clients are able to commonly use network resources and realize an inter-network backup network of multiple points to multiple points and of multiple destinations with a best performance-to-price ratio and most effective overhead of network resources, so as to construct bases for uniform global backup world.

The Local Journal Stager in the present invention is referred as a journal receiving and transmitting device belonging to a same local high speed network (above speed level of LAN) to a client site needing online backup. The Local Journal Stagers receive journal data of respective Local Production Sites (referred as sites at which local production servers and backup clients thereof are located), and transmit the journal data to the Remote Journal Stagers in conjunction with a plurality of advanced techniques. Descriptions of the Local Journal Stagers are given below:

|   | Function | Operation Technique | Advantage |
|---|---|---|---|
| 1 | Local site journal collector | The backup client adds IDs of local sites and destination disaster recovery sites into journal data packages, and sends the journal data packets to journal stagers on the local high speed network according to configuration information. The journal stagers buffer journal data by storage devices. | Journal backup data of the Local Production Sites is collected by relatively fast local area network to reduce backup windows as for Local Production Sites. |
| 2 | Multipath entry | The Local Journal Stager can simultaneously receive and differentiate local journal data from multiple sites in different paths according to ID identifications of local sites and destination disaster recovery sites in conjunction with network architecture. | It can be set to collect journals of multiple local sites simultaneously, and the network bandwidth is sufficiently utilized. |
| 3 | Relay function | The journal data buffered in the Local Journal Stagers can be transmitted to the Remote Journal Stagers by transmitters in accordance with Qos policies such as time, flow rate, etc. | As switch, the journal data is temporally stored and retransmitted, no other reading/writing work is involved, and thus there is no additional security problem either. |
| 4 | Packetizing multiplexing | When capacity of the journal data package is relatively large or the stager is connected to multiple high speed paths, the data package is unpackaged into several small data packages, which are sent to remoter journal stagers along multiple paths at the same time. Meanwhile, the unpackaged small data packages all have source, destination site identifications and queue sequence numbers added during the unpackaging for ensuring that they can be completely recombined in sequence in the Remote Journal Stagers. | The journal data is packetized and is transmitted forward in multipath to accelerate transmission speed. |
| 5 | Optimal path searching | Each Local Journal Stager will maintain one address table of address and response time of the Remote Journal Stager that is connectable to itself, and periodically update this address table by detection operations. Every time the journal data is sent outwards, the next Remote Journal Stager with fastest speed is calculated in conjunction with the destination site and the response time. | The shortest and fastest path to destination is automatically searched to accelerate transmission speed. |
| 6 | Searching Remote Journal Stagers manually or automatically | Besides automatically selecting the Remote Journal Stagers in accordance with algorithm policies, it is allowed to specify that journal data of specific client sites must undergo journal data transmission through a certain or a certain series of Remote Journal Stagers by modifying configuration information. | A plurality of operation modes are involved to ensure stabilization with flexibility and effectively handle situations such as emergency, abnormity, etc. |

The Remote Journal Stager in the present invention is referred as a journal receiving and transmitting device located in a network environment (speed level of Internet) outside client Local Production Sites (having a same definition to that of the Local Production Site hereinabove) and Disaster Recovery Sites. The Remote Journal Stagers receive journal data of respective local journal sites, and transmit the journal data to the next Remote Journal Stager or destination disaster recovery site in conjunction with a plurality of advanced techniques. Descriptions of the Remote Journal Stagers are given below:

| Function | Operation Technique | Advantage |
| --- | --- | --- |
| 1 Multipath entry | The Remote Journal Stager can simultaneously receive and differentiate journal data transmitted from multiple local or remote journal sites in different paths through ID identifications of source sites and destination disaster recovery sites in conjunction with network architecture. | It can be set to collect journals of multiple local stagers or remote stagers simultaneously, and the network bandwidth is sufficiently utilized. |
| 2 Relay function | The journal data buffered in the Remote Journal Stagers is transmitted to other Remote Journal Stagers or destination disaster recovery sites by transmitters in accordance with QoS policies such as time, flow rate, etc. | As switch, the journal data is temporally stored and retransmitted, no other reading/writing work is involved, and thus there is no additional security problem either. |
| 3 Automatic time sequence scheduling | When the journal stager accepts a plurality of journal data transmission tasks simultaneously, it can set automatic scheduling function, so that the journal data is automatically and real time re-sequenced and then transmitted forward by synthetically calculating factors such as priority of journal data, RPO (Recovery Point Object, which can be understood as the time before which the journal data should arrive the destination disaster recovery site), data volume, network bandwidth speed, system resources, etc, rather than being transmitted forward in accordance with sequence of original reception. | Transmission time sequence of the journal data is automatically scheduled in accordance with the policies, to improve utilization ratio of network bandwidth and optimize allocation of stager resources in premise that backup indexes and priority requirements are ensured. |
| 4 Packetization multiplexing | When capacity of the journal data package is relatively large or the stager is connected to multiple high speed paths, the data package is unpackaged into several small data packages, which are sent to remoter journal stagers or destination disaster recovery sites along multiple paths at the same time. Meanwhile, the packaged small data packages all have source, destination site identifications and queue sequence numbers added during the unpackaging for ensuring that they can be completely recombined in sequence in the Remote Journal Stagers. | The journal data is packetized and is transmitted forward in multipath to accelerate transmission speed. |
| 5 Optimal path searching | Each Remote Journal Stager will maintain one address table of address and response time of the Remote Journal Stager that is connectable to itself, and periodically update this address table by detection operations. Each time the journal data is sent outwards, the next Remote Journal Stager with fastest speed is calculated in conjunction with the destination site and the response time. | The shortest and fastest path to destination is automatically searched to accelerate transmission speed. |
| 6 Searching Remote Journal Stagers manually or automatically | Besides automatically selecting the Remote Journal Stagers in accordance with algorithm policies, it is allowed to specify that journal data of specific client sites must undergo journal data transmission through a certain or a certain series of Remote Journal Stagers by modifying configuration information. | A plurality of operation modes are involved to ensure stabilization with flexibility. |

Figure 2:
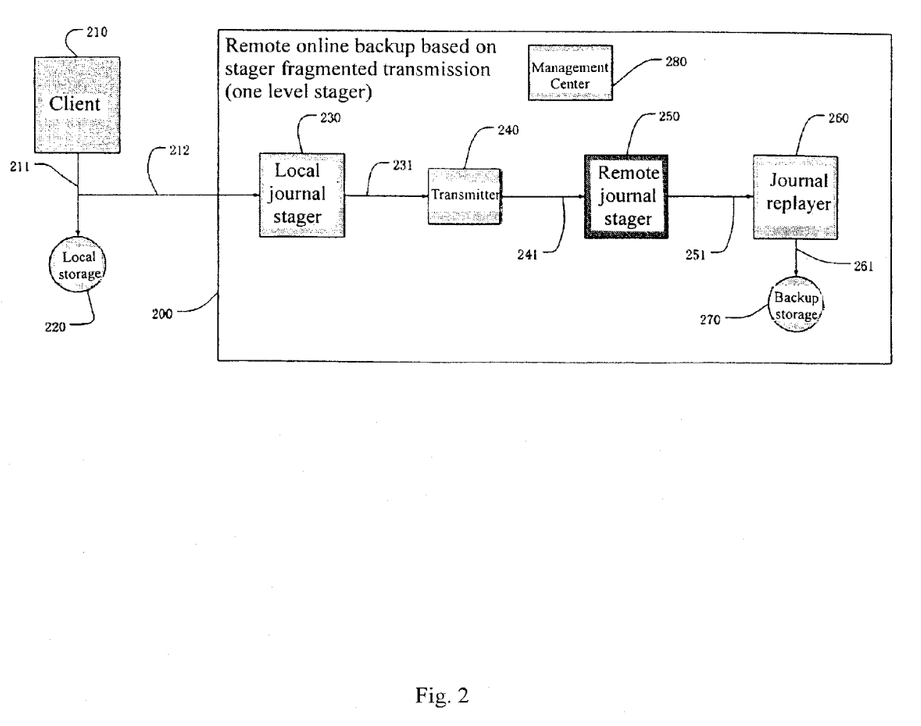
FIG. 2 illustrates components and operations of a backup system in the present invention, in which a Journal Stager and a Journal Replayer (JournalReplayer) are included.

FIG. 2 illustrates the remote online backup system 200 of the present invention, in which the system obtains data written by a client 210 into local storage 220 thereof (arrow 211) and transmits the data to a Local Journal Stager (LocalStager) 230 in manner of journal (arrow 212). It can be seen that being similar with the previous backup system 100, the system 200 will also store journals firstly, but what is different is that the system 200 will not immediately apply the journals transmitted to the Local Journal Stager (LocalStager) 230 to a final backup server (for example 140) and backup storage (for example 150). The Local Journal Stager (LocalStager) 230 will reserve the journals, and the journals will be pushed to a transmitter 240 in accordance with a predefined time policy (arrow 231). The transmitter 240 is a processing process, which will perform processing including data compression, data encryption, etc. on data transmitted on the network. If the Continued Data Protection (CDP) function is not needed, the transmitter can also perform processing for deleting duplicate data, and only journals enough for producing current data final condition are needed to be reserved. As such, the journals are sent to the Remote Journal Stager (RemoteStager) 250 (arrow 241) by the transmitter in accordance with the predefined time policy. When the Remote Journal Stager (RemoteStager) 250 receives the journal data, it will transmit the journal data to a Journal Replayer (JournalReplayer) 260 (arrow 251), and the Journal Replayer (JournalReplayer) 260 will apply new journals into data stored by backup storage 270 (arrow 261).

The system 200 mainly realizes a fragmented transmission mechanism with stagers. Backup performance of the client 210 is improved and system overhead is reduced by coordination between the Local Journal Stager (LocalStager) 230 and the Remote Journal Stager (RemoteStager) 250. For example, the client 210 is located in Beijing and destination of remote backup is located in Hong Kong. Data journals of the client are transmitted directly from Beijing to Hong Kong by using previous inventions, and if network speed is relatively slow or data volume is huge, then great system resources of the client 210 will be consumed. Whereas, by using the manner of the system 200, the journals are firstly stored in the Local Journal Stager (LocalStager) 230, are then transmitted to the Remote Journal Stager (RemoteStager) 250 by the transmitter, and are finally applied into the backup storage 270. Since speed from the client 200 to the Local Journal Stager (LocalStager) 230 is relatively fast, time for the client 200 to backup data once is equivalently lessened, and performance of backup services is improved.

Figure 3:
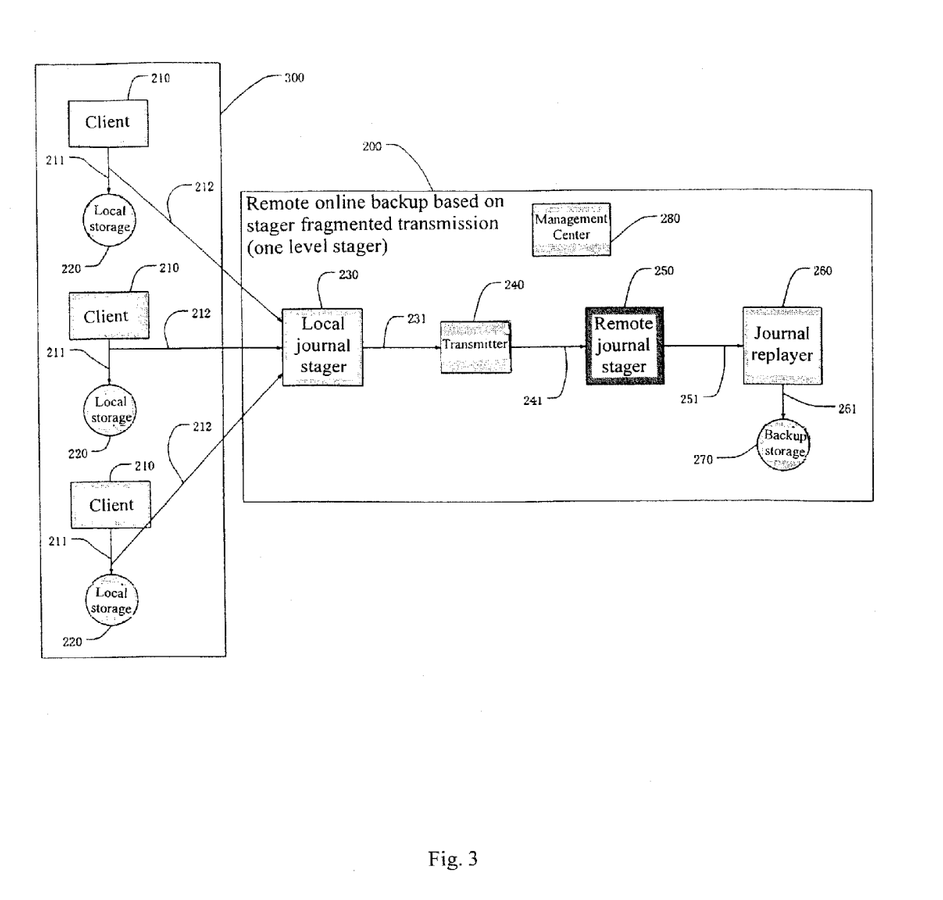
FIG. 3 illustrates operation manners and characteristic of a Local Journal Stager (LocalStager) in the present invention.

FIG. 3 describes detailed conditions of the Local Journal Stager (LocalStager) 230. It is assumed that a Local Production Site 300 has a plurality of clients 210, which transmit journal data to the Local Journal Stager (LocalStager) 230 in a same manner (arrow 212), and thus the Local Journal Stager (LocalStager) 230 has a centralized function, which simplifies configuration and saves investments. Just because the centralized function, data of a plurality of users might be saved herein, and thus the Local Journal Stager (LocalStager) 230 has a data authentication and encryption function. As for the case of storing a huge amount of journal data, a compression function can be activated to reduce storage volume that data actually occupies. As such, if the user does not need the Continued Data Protection (CDP) function, the Local Journal Stager (LocalStager) 230 can also perform processing for deleting duplicate data, and only journals enough for producing current data final condition are needed to be reserved.

Figure 4:
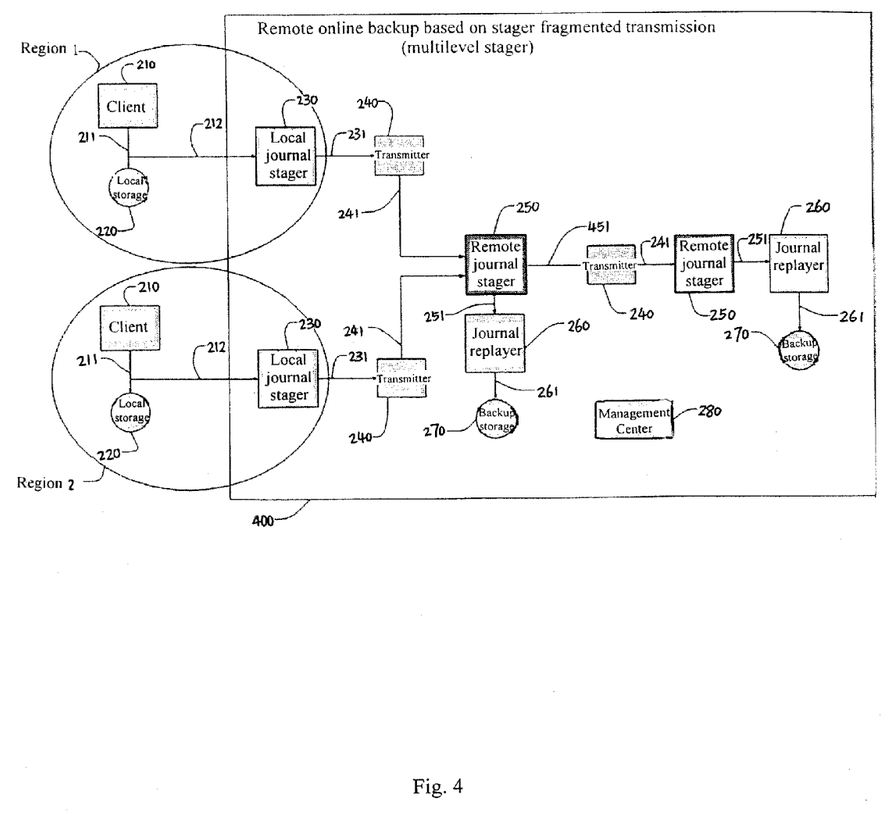
FIG. 4 illustrates components and operations of a multi-level stager backup system in the present invention.

FIG. 4 explains another embodiment of the present invention, which comprises corporations/organizations in a plurality of areas of a plurality of accessing system 400, in which the clients 210 are involved. One major difference between the system 400 and the system 200 is that the system 400 will have one additional processing 451. After the journals are transmitted to the Remote Journal Stager (RemoteStager) 250, the processing 451 will check whether destination site flags SID in these received journals coincide with present site flags SID. If so, the journals will be transmitted to the Journal Replayer (JournalReplayer) 260; if not, the journals will be retransmitted to the transmitter 240 (arrow 451) and is further transmitted to the next Remote Journal Stager (RemoteStager) 250 by the transmitter 240 (arrow 251), until the journals are sent into the Remote Journal Stager (RemoteStager) 250 having site flags coinciding with the destination site SID of the journals.

The system 400 of FIG. 4 describes an embodiment in the case that branch organizations or branch corporations are very distant from remote backup destination or the network environment is complicated. For example, a region 1 is located in Beijing, and backup destination is Singapore. If network speed from Beijing to Singapore is relatively slow, relatively long time and large system overhead are still needed in accordance with the one level stager manner of the system 200. And if it is the case that network from Beijing to Hong Kong is relatively fast and network from Hong Kong to Singapore is also relatively fast at the same time, after data journals of the client 210 in the region 1 are stored into the local stager 230 in Beijing, the data journals can be firstly transmitted into the journal stager (RemoteStager) 250 in Hong Kong with relatively fast connection speed, and then the journal stager (RemoteStager) 250 in Hong Kong transmits the journals to Singapore (arrow 241) through the transmitter 240. Thus, backup performance in region 1 Beijing is accelerated.

Figure 5A:
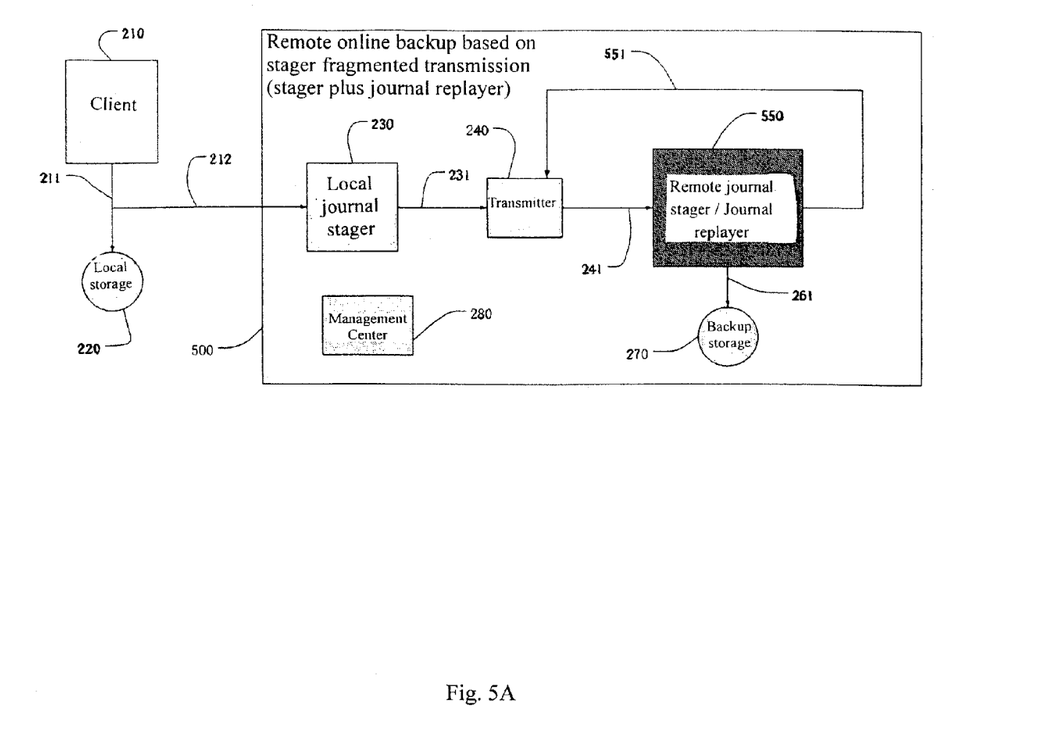
FIG. 5A illustrates components and operations of a backup system with a combination of the Journal Stager and the Journal Replayer (JournalReplayer) in the present invention.

FIG. 5A describes a remote backup system 500, which contains the characteristic of the system 400; however, the Remote Journal Stager (RemoteStager) 250 and the Journal Replayer (JournalReplayer) 260 in the system 500 are combined. If the system 400 is applied to backup service provider, then journals in the Remote Journal Stager (RemoteStager) 250 can only be temporally stored, and will be periodically deleted after being transmitted to the Journal Replayer (JournalReplayer) 260; the system 500 is used to construct disaster recovery sites for end users, and thus journal are dependably stored into the stager of the disaster recovery site, and are applied to the backup storage 270 through the Journal Replayer (JournalReplayer) of the disaster recovery site; in the system 500, journal stager and the Journal Replayer (JournalReplayer) are combined into 550. In addition, the Continued Data Protection (CDP) function is realized by storing journals in the disaster recovery site, premise of which is that the transmitter 240 does not activate the duplicate data deletion function. And when multiple disaster recovery sites are needed to be constructed and duplicate backup is performed on data, journals in the journal stager and the replayer can be sent into the journal stager and the replayer 550 of another disaster recovery site by the transmitter 240 (arrow 551), and are applied into backup storage 270 of the disaster recovery site. For example, if one enterprise headquarter has branch corporations established in New York, United States, Hong Kong, and Shanghai, in which disaster recovery sites are established in both of Shanghai and New York, then data in Hong Kong can be firstly backup to the disaster recovery site in Shanghai, and journals are also stored into the disaster recovery site in Shanghai. The journals are further transmitted to the disaster recovery site in New York by the transmitter 240 as the second level backup.

Figure 5B:
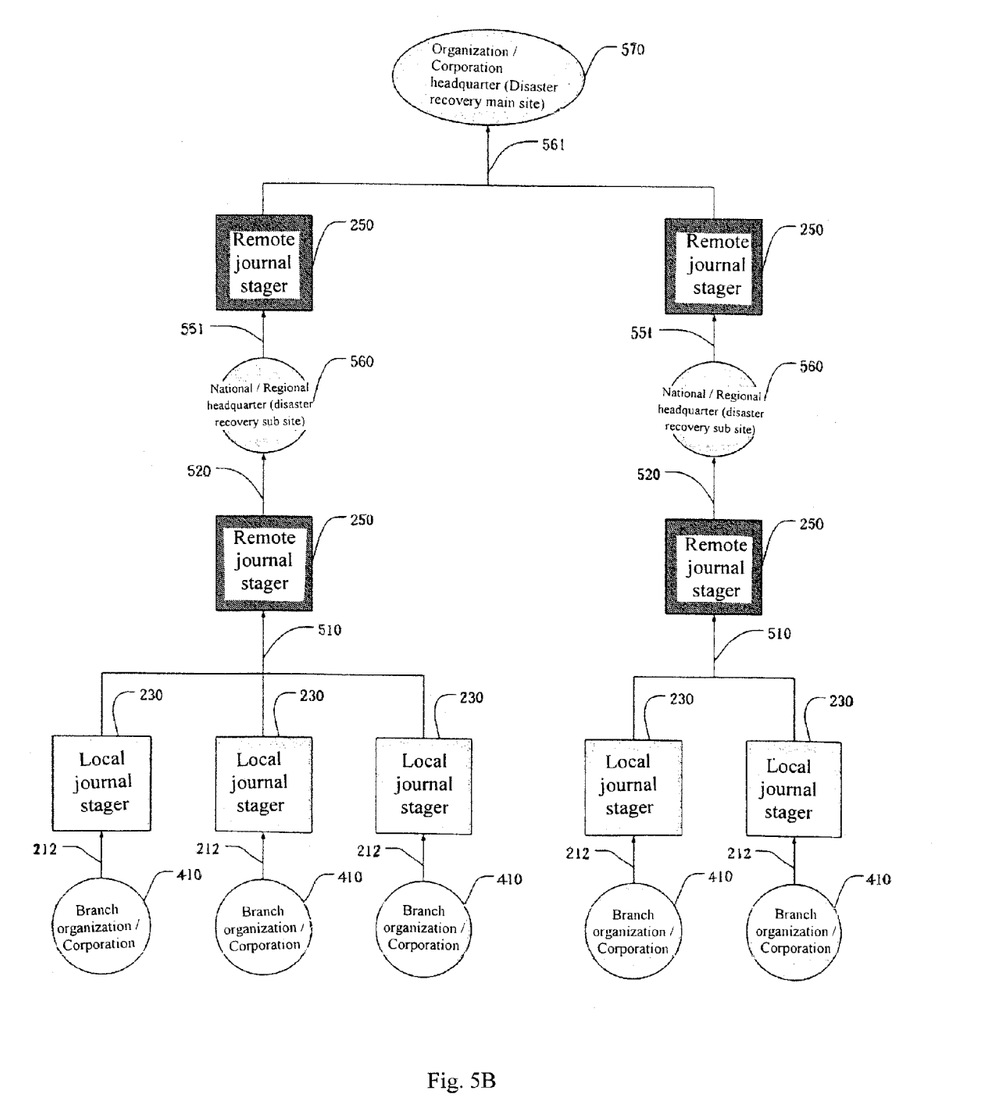
FIG. 5B describes an overall architecture diagram of Disaster Recovery Sub Site (SubSite)/Disaster Recovery Main Site (MainSite) backup recovery scheme.

FIG. 5B describes a technique combining multilevel stager and disaster recovery site, and how to implement a backup disaster recovery policy in global range with a branch corporation architecture, in which one scheme with cascading architecture and coordination of Disaster Recovery Sub Site (SubSite) and Disaster Recovery Main Site (MainSite). For example, one Japanese multinational corporation has its headquarter established in Japan, and headquarters of major regions established in Hong Kong, Los Angeles, etc, which correspondingly hold respective branch corporations, such as Beijing, Shanghai, Chengdu, Taiwan, etc in the Asia Pacific major region dominated by Hong Kong. Then, a Disaster Recovery Main Site (MainSite) 570 can be deployed in the corporation headquarter, and Disaster Recovery Sub Sites (SubSite) 560 can be deployed in the major region headquarters. Meanwhile, the respective branch corporations all can directly access Local Journal Stagers (LocalStager) 230 in the provinces/states at which they are located or in the nearby provinces/states. The branch corporations belonging to respective major regions respectively transmit data to the Local Journal Stagers (LocalStager) 230 in manner of journal (arrow 212). The journals undergo retransmission processing process by the transmitter (which might be needed to be repeated for several times), and then are sent to the Remote Journal Stagers (RemoteStager) 250 connected with the major region headquarter Disaster Recovery Sub Sites (SubSite) 560. The Remote Journal Stagers (RemoteStager) 250 send the journals to the major region headquarter Disaster Recovery Sub Sites (SubSite) 560 later. The Disaster Recovery Sub Sites (SubSite) 560 replay the journals to a backup storage device, simultaneously further send the journals to the Remote Journal Stagers (RemoteStager) 230 connected with the corporation headquarter Disaster Recovery Main Site (MainSite) 570 (arrow 551), and then retransmit the journals to the Disaster Recovery Main Site (MainSite) 570 (arrow 561). After the Disaster Recovery Main Site (MainSite) 570 receives the journals, it replays and stores the journals into the backup storage device, and thus, backup of data of branch corporations into the corporation headquarter Disaster Recovery Main Site (MainSite) 570 is realized. One scheme having the Disaster Recovery Sub Sites (SubSite) 560 and the Disaster Recovery Main Site (MainSite) 570 is constructed, which can effectively improve backup performance, besides realizing duplicate backup of data and providing security. For example, speed for branch corporations such as Beijing, Shanghai, etc to directly access the corporation headquarter Disaster Recovery Main Site (MainSite) 570 is relatively slow, but speed for accessing the major region headquarter Disaster Recovery Sub Site (SubSite) 560, i.e., Hong Kong is relatively fast; speed from the major region headquarter Disaster Recovery Sub Site (SubSite) 560 to the corporation headquarter Disaster Recovery Main Site (MainSite) 570 is relatively fast. Thus, respective branch corporations firstly transmit the journals to the Disaster Recovery Sub Sites (SubSite) 560 with relatively fast speed, and the Disaster Recovery Sub Sites (SubSite) 560 send the journals to the Disaster Recovery Main Site (MainSite) 570. Thus, as for respective branch corporations, the journals are directly transmitted to the Disaster Recovery Main Site (MainSite) 570, which avoids consuming a lot of time and resources, so that overhead can be effectively saved and performance is provided.

Figure 6:
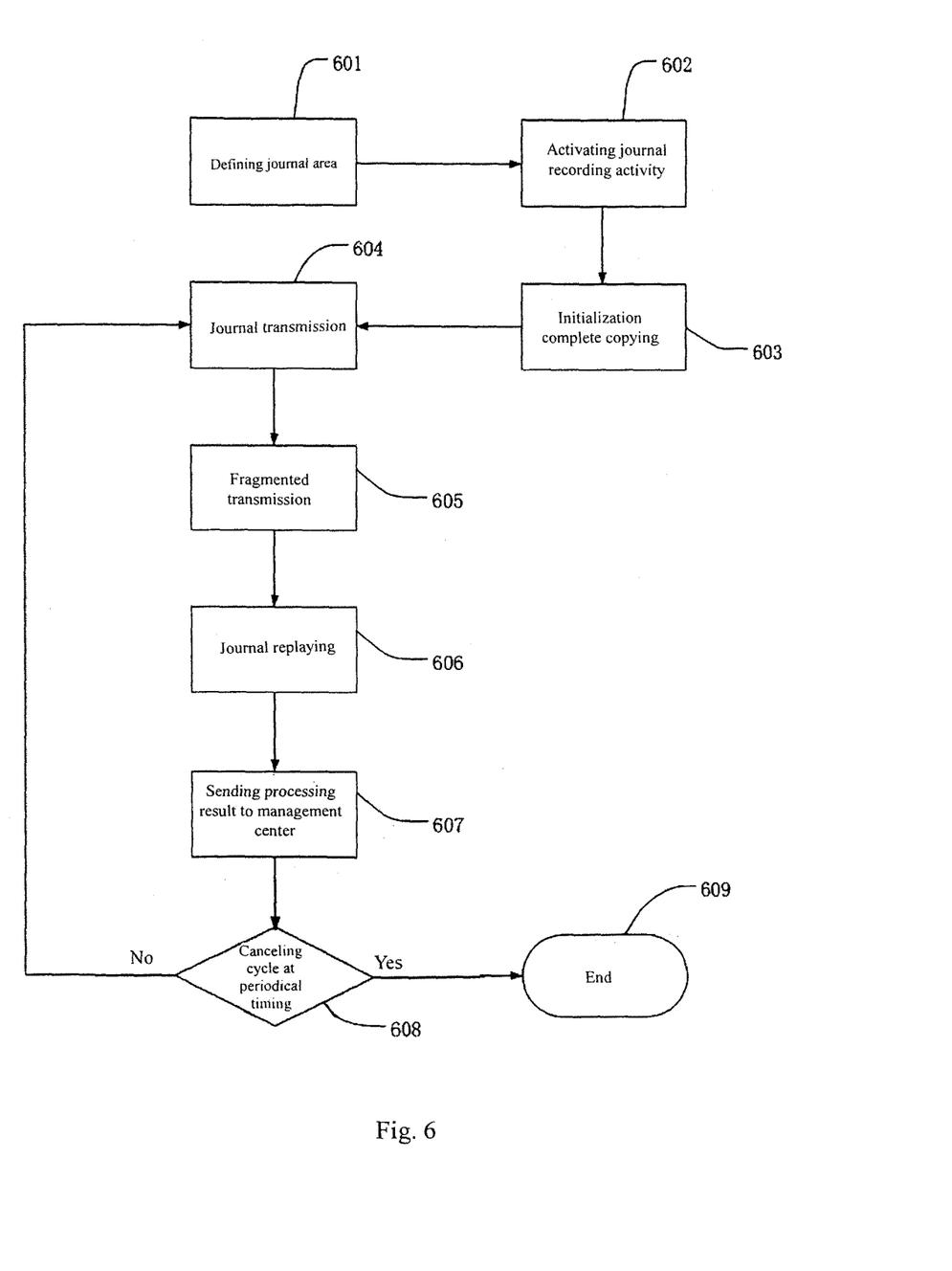
FIG. 6 illustrates a work flow diagram in the present invention.

FIG. 6 describes a work flow diagram of the present invention. To implement the present invention, firstly a journal area 601 need to be defined. Then, a journal activity recording 602 need be activated to allow system recording and storing journals. After data protection is set, current data need be completely copied into the backup storage 270 described above. This process is called initialization complete copying 603, journal transmission can be selected to be skipped and data is directly copied when performing this process. Since the client may continue to perform data writing during the copying process, journals with data written in after the copying is started need be recorded and transmitted, and journal replaying need be performed in accordance with the newly obtained journals after the copying is completed, so as to ensure integrality and consistency of data in the backup storage 270.

After the data in the backup storage 270 keeps consistent, a journal transmission process 640 can be performed according to the flow. The journal transmission is performed by the client 210, and the journals will be pushed to the Local Journal Stager (LocalStager) 230. After the journals arrive at the Local Journal Stager (LocalStager) 230, a fragmented transmission process 605 begins. In the remote online backup system, since bandwidth of network connection between the client 210 and the backup destination is not wide or speed of direct connection between the two points is relatively low, the fragmented transmission 605 need be utilized. The fragmented transmission need not occupy a lot of bandwidth and system resources of the client 210, these tasks are all processed by respective Local Journal Stagers (LocalStager) 230, which will effectively reduce burdens of respective clients, i.e., production servers in most cases.

When the journals arrive at the destination end of the system, the Journal Replayer (JournalReplayer) 260 will perform the journal replaying process 606. The Journal Replayer (JournalReplayer) 260 will apply the journals into the backup storage 270, and the writing operation performed is totally the same to that performed by the client 210, thus ensuring consistency between data stored in both ends. After the journals are replayed, the system will perform a determining process 607 at each predetermined timing interval to check whether work cycle need be stopped. If there is no related instruction, it will return to perform the next journal transmission 604 and perform remaining operations. When there is an instruction setting needs to cancel the cycle, the system will arrive at an ending condition 608.

Figure 7:
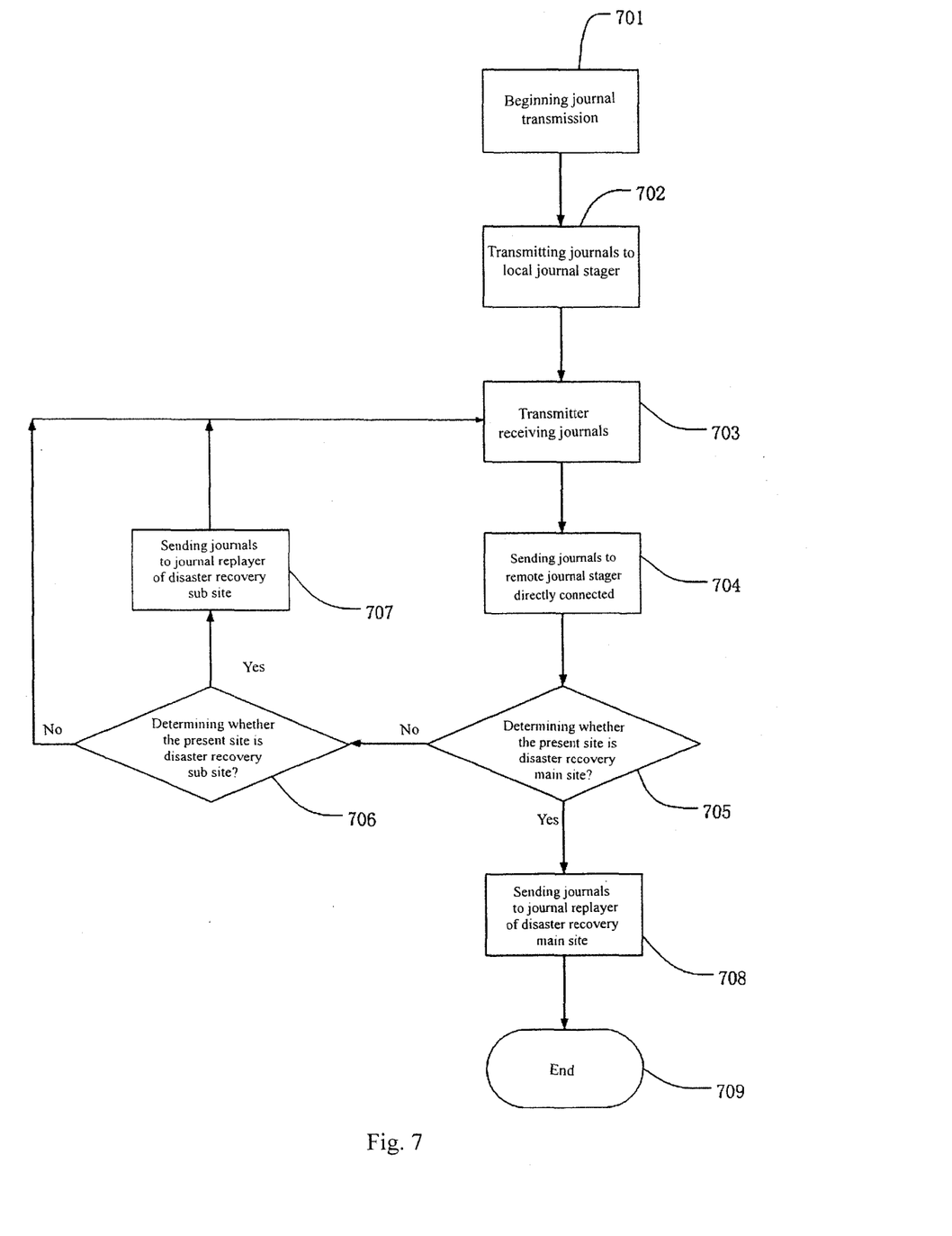
FIG. 7 illustrates a work flow diagram of Disaster Recovery Sub Site (SubSite)/Disaster Recovery Main Site (MainSite) backup recovery scheme in the present invention.

FIG. 7 describes a work flowchart for backup restoration scheme of the Disaster Recovery Sub Sites (SubSite)/the Disaster Recovery Main Site (MainSite). After beginning journal transmission 701, respective branch corporations will perform a process 702 for transmitting the journals to the Local Journal Stager (LocalStager), and when a process 703 for receiving the journals by the transmission is completed, the journals will be sent to a Remote Journal Stager 704 directly connected to themselves. Then the Remote Journal Stager (RemoteStager) 250 will perform one determining process 705 for determining whether SID of the present site coincide with SID of the destination Disaster Recovery Main Site (MainSite) marked in the journals. If not coinciding, One determining process 706 for determining whether the present site is the Disaster Recovery Sub Site (SubSite) will be performed, if the present site is the Disaster Recovery Sub Site, a process 707 for sending the journals to a Journal Replayer (JournalReplayer) of the present Disaster Recovery Sub Site (SubSite) is performed, or if the present site is not the Disaster Recovery Sub Site, the next process for sending the journals to the Remote Journal Stager (RemoteStager) 250 is performed. When the process 705 determines that the SID of the present site is identical with the SID of the Disaster Recovery Main Site (MainSite) marked in the journals, the cycle is ended, and a process 708 for sending the journals to Journal Replayer (JournalReplayer) of the Disaster Recovery Main Site (MainSite) is performed. Thus, one complete process for the backup of branch corporation data into the Disaster Recovery Main Site (MainSite) reaches an ending condition 709.

The present invention describes a limited number of implementations, and more alternations, modifications and other applications corresponding to the present invention may be implemented.

Although the present invention is described with reference to specific preferred embodiments thereof, it is understood by those skilled in the art that various modifications in form and details can be made to these embodiments without departing from the spirit and scope of the present invention as defined in the attached claims.

What is claimed is:

1. A remote online backup method based on stager fragmented transmission, comprising:
 defining a journal storage system as a journal relay system, i.e., a Journal Stager;

dividing the Journal Stager into a Local Journal Stager and a Remote Journal Stager to optimize backup transmission performance of the whole online backup system;

setting between the Local Journal Stager and the Remote Journal Stager a transmitter, by which a journal is transmitted from one stager to another stager;

applying the journal to a backup storage device through a Journal Replayer at a backup destination site;

the Local Journal Stager comprises a journal receiving and transmitting device belonging to a same local high speed network to a client site needing online backup, and the Remote Journal Stager comprises a journal receiving and transmitting device located in a network environment outside client Local Production sites;

wherein the Journal Stager has an identifying function for destination site flags in the journal to determine whether journal data has arrived at destination, or the journal data needs to be further retransmitted, so that the Journal Stager has differences in the Local Journal Stager and the Remote Journal Stager; when data needs to be backup to remote sites with limited network condition, the data is firstly transmitted through the Local Journal Stager.

2. The method according to claim 1, wherein the Journal Stager comprises all systems accessible by a client server through network, which comprise a storage device for storing journals and processing program.

3. The method according to claim 1, when the destination site flag in the received journal does not coincide with the present site flag, the journal is transmitted to the next Remote Journal Stager by the transmitter, until the journal is sent to the Remote Journal Stager of a site having the flag coinciding with the destination site flag in the journal.

4. The method according to claim 1, wherein the Journal Stager has a data authentication and encryption function.

5. The method according to claim 4, wherein the Journal Stager also has a duplicate data deletion processing function.

6. The method according to claim 1, wherein the transmitter transmits the journal between the Local Journal Stager and the Remote Journal Stager in accordance with a predefined time policy.

7. The method according to claim 6, wherein the transmitter is also in charge of processing for transmission process of the journal between the Local Journal Stager and the Remote Journal Stager, which comprises data compression, data encryption, and duplicate data deletion.

8. The method according to claim 1, wherein the Journal Stager and the Journal Replayer can be combined to construct a Disaster Recovery Site for storing journal data chronically.

9. A method for performing remote online backup by Disaster Recovery Sub Sites and a Disaster Recovery Main Site, comprising:
a. a plurality of clients transmitting journals to respective corresponding Local Journal Stagers respectively;
b. sending the journals to directly connected Remote Journal Stagers by transmitters;
c. the Remote Journal Stagers determining whether the present site coincides with a flag of a destination Disaster Recovery Main Site in a received journal;
d. determining whether the present site is a Disaster Recovery Sub Site if not coinciding; sending the journal to a Journal Replayer of the present Disaster Recovery Sub Site if the present site is the Disaster Recovery Sub Site and returning to step b, and directly returning to step b if the present site is not the Disaster Recovery Sub Site;
e. performing processing for sending the journal to a Journal Replayer of the Disaster Recovery Main Site if coinciding;
each of the Local Journal Stagers comprises a journal receiving and transmitting device belonging to a same local high speed network to a client site needing online backup, and each of the Remote Journal Stagers comprises a journal receiving and transmitting device located in a network environment outside client Local Production sites.

10. A remote online backup system based on stager fragmented transmission, comprising:
one or more clients for writing data into their local storage and transmitting the data to Local Journal Stagers in manner of journal;
the Local Journal Stagers for reserving the journals from the clients and pushing the journals to the transmitters;
the transmitters for transmitting the journals from the Local Journal Stagers to Remote Journal Stagers;
the Remote Journal Stagers for receiving the journals and transmitting the journals to Journal Replacers or other Remote Journal Stagers; and
the Journal Replayer for applying the journals to device storage devices;
the Local Journal Stager comprises a journal receiving and transmitting device belonging to a same local high speed network to a client site needing online backup, and the Remote Journal Stager comprises a journal receiving and transmitting device located in a network environment outside client Local Production sites;
wherein the Journal Stager has an identifying function for destination site flags in the journal to determine whether journal data has arrived at destination, or the journal data need to be further retransmitted, so that the Journal Stager has differences in the Local Journal Stager and the Remote Journal Stager; when data need to be backup to remote sites with limited network condition, the data is firstly transmitted through the Local Journal Stager.

11. The system according to claim 10, wherein the Journal Stager comprises all systems accessible by a client server through network, which comprise a storage device for storing journals and processing program.

12. The system according to claim 10, when the Remote Journal Stager determines that the destination site flag in the received journal does not coincide with the present site flag, the Remote Journal Stager transmits the journal to the next Remote Journal Stager by the transmitter, until the journal is sent to the Remote Journal Stager of a site having the flag coinciding with the destination site flag in the journal.

13. The system according to claim 10, wherein the Local Journal Stager and the Remote Journal Stager have a data authentication and encryption function.

14. The system according to claim 13, wherein the Local Journal Stager and the Remote Journal Stager also have a duplicate data deletion processing function.

15. The system according to claim 10, wherein the transmitter transmits the journal between the Local Journal Stager and the Remote Journal Stager in accordance with a predefined time policy.

16. The system according to claim 15, wherein the transmitter is also in charge of processing for transmission process of the journal between the Local Journal Stager and the Remote Journal Stager, which comprises data compression, data encryption, and duplicate data deletion.

17. The system according to claim 10, wherein the Remote Journal Stager and the Journal Replayer can be combined to construct a Disaster Recovery Site for storing journal data chronically.

18. A system for performing remote online backup by Disaster Recovery Sub Sites and a Disaster Recovery Main Site, comprising:
- a plurality of clients for transmitting journals to respective corresponding Local Journal Stagers respectively;
- a plurality of Local Journal Stagers for sending the journals to Remote Journal Stagers directly connected with the Local Journal Stagers through transmitters;
- a plurality of transmitters for transmitting the journals from the Local Journal Stagers to the Remote Journal Stagers;
- a plurality of Remote Journal Stagers for receiving the journals from the transmitters and sending the journals to the Disaster Recovery Sub Sites or the Disaster Recovery Main Site connected to the plurality of Remote Journal Stagers;
- the plurality of Disaster Recovery Sub Sites for replaying the journals to backup storage devices and sending the journals to the Remote Journal Stagers connected to the Disaster Recovery Main Site simultaneously; and
- the Disaster Recovery Main Site for receiving the journals from the Remote Journal Stagers and replaying and storing the journals to a backup storage device;
- each of the Local Journal Stagers comprises a journal receiving and transmitting device belonging to a same local high speed network to a client site needing online backup, and each of the Remote Journal Stagers comprises a journal receiving and transmitting device located in a network environment outside client Local Production sites.

* * * * *